United States Patent [19]

Yasuda et al.

[11] Patent Number: 5,077,151

[45] Date of Patent: Dec. 31, 1991

[54] ALKALINE STORAGE BATTERY AND PROCESS FOR PREPARING THE SAME

[75] Inventors: Hideo Yasuda; Kozi Yoshimura, both of Kyoto, Japan

[73] Assignee: Japan Storage Battery Co., Ltd., Kyoto, Japan

[21] Appl. No.: 415,214

[22] PCT Filed: Jan. 20, 1989

[86] PCT No.: PCT/JP89/00054

§ 371 Date: Sep. 22, 1989

§ 102(e) Date: Sep. 22, 1989

[87] PCT Pub. No.: WO89/06865

PCT Pub. Date: Jul. 27, 1989

[30] Foreign Application Priority Data

Jan. 22, 1988 [JP] Japan .................................. 63-13345

[51] Int. Cl.$^5$ .................................................... H01M 10/24
[52] U.S. Cl. .................................... 429/206; 429/219; 429/222; 429/223; 429/224
[58] Field of Search ............... 429/219, 222, 223, 224, 429/220, 218, 60, 206

[56] References Cited

U.S. PATENT DOCUMENTS

| | | | |
|---|---|---|---|
| 3,057,942 | 10/1962 | Smith et al. | 429/60 |
| 3,089,913 | 5/1963 | Garten et al. | 429/60 |
| 3,170,819 | 2/1965 | Abramson | 429/60 |
| 3,951,686 | 4/1976 | Ness et al. | 429/222 |
| 4,520,087 | 8/1985 | Kamata et al. | 429/222 X |
| 4,897,323 | 1/1990 | Hennrich et al. | 429/222 X |

*Primary Examiner*—Anthony Skapars
*Attorney, Agent, or Firm*—Sughrue, Mion, Zinn, Macpeak & Seas

[57] ABSTRACT

This invention is to provide a nickel-cadmium alkaline storage battery in which the content of nickel hydroxide and/or nickel oxide in a negative active material is from 2 to 60 wt% based on the total amount of cadmium, and the content of cadmium hydroxide in the negative active material is 0.95 or lower in terms of a weight ratio to nickel hydroxide in a positive active material; a manganese dioxide-cadmium alkaline storage battery in which the content of cadmium hydroxide in a negative active material in the discharged state is 0.84 or lower in terms of a weight ratio to manganese dioxide in a positive active material; and a silver oxide-cadmium alkaline storage battery in which the content of cadmium hydroxide in a negative active material in the discharged state is 1.36 or lower in terms of a weight ratio to silver in a positive active material. According to the alkaline storage battery of the present invention, charge control can easily be done with high accuracy because the battery shows abrupt and considerable changes in voltage in the final stage of charge, and further, since the battery need almost no cadmium hydroxide for reserve, an oxygen gas generated from a positive electrode can be absorbed efficiently, so that it is also possible to perform, with high reliability, quick 1C charge of rectangular batteries and superquick charge such as 10C charge.

12 Claims, 5 Drawing Sheets

ALKALINE STORAGE BATTERY AND PROCESS FOR PREPARING THE SAME

TECHNICAL FIELD

The present invention relates to an alkaline storage battery, a process for preparing the same, and a method of charging the battery.

BACKGROUND ART

As storage batteries, there are presently being mainly used lead batteries and nickel-cadmium batteries, although silver oxide-zinc batteries are also being used to some extent.

Recently, development of a new storage battery has been expected in relation to the miniaturization and weight reduction of electronic machines and apparatus.

The nickel-cadmium battery now in use usually employs for its positive electrode an active material having a cobalt content of from 2 to 10 wt%. On the other hand, employed as its negative electrode is a sintered nickel substrate having a porosity of about 80%, or a plate prepared by fixing cadmium hydroxide and metallic cadmium as active materials on a nickel-plated perforated steel. When this conventional nickel-cadmium battery is charged, the charging should be carried out so as to apply an electric current in an amount corresponding to 105 to 150% of its charge capacity. This is because oxygen is apt to generate during charge, and this lowers the charge efficiency of the positive electrode, resulting in a low Coulomb efficiency. That is, the conventional nickel-cadmium battery has a drawback that its capacity is recovered only when the charging is performed so as to overcharge it. This means that the conventional nickel-cadmium battery should be overcharged while oxygen is being allowed to evolve from the positive electrode. In the nickel-cadmium battery, the oxygen which has evolved from the positive electrode as a result of the reaction shown by equation (1) is absorbed on the negative plate as shown by equation (2).

$$4OH^- \rightarrow O_2 + 2H_2O + 4e \tag{1}$$

$$O_2 + 2H_2O + 4e \rightarrow 4OH^- \tag{2}$$

Therefore, even in the overcharge region, hydrogen does not evolve from the negative electrode and the oxygen generated from the positive electrode is absorbed on the negative electrode, resulting only in heat generation. For this reason, the charging of a nickel-cadmium battery is performed with a constant current by means of a method in which the charging is stopped after an increase in temperature of the battery due to the heat generated in the overcharge region is detected with a thermistor or the like, a method in which the charging is stopped after a phenomenon wherein a decrease in charging voltage occurs due to gas absorption is detected, or a method in which the charging is stopped after an increase in inner pressure is detected with a pressure sensor. In order to perform quick charge according to this charging method, the gas-absorbing performance in the overcharge region should be improved. Since the rate constant for this gas absorption is in proportion to the partial pressure of oxygen, a cylindrical battery is preferably subjected to quick charge because a cylindrical battery case is difficult to suffer from deformation or breakage even if the inner pressure of the battery increases. Even in this case, charging at 1C is the limit. On the other hand, from the viewpoint of energy density rectangular battery is more advantageous than a cylindrical one. However, since the withstand pressure of the rectangular battery case is lower than that of the cylindrical battery case, its withstand pressure is about 5 kg/cm$^2$ at most even if a metal such as iron, etc. is employed as the material for the case. Hence, charging at 0.3 C is the maximum limit. As a method of charging this nickel-cadmium battery, there may be mentioned a method in which an increase in charging voltage is detected, but the value is 100 to 150 mV at most. Further, since the increase in voltage becomes small as the temperature increases, not only it becomes necessary to make temperature corrections, but also the method is not so reliable. Furthermore, in the case of constant-voltage charging, a so-called runaway phenomenon is produced, leading to breakage of batteries in some cases.

Moreover, the active materials of negative electrode for sealed-type batteries currently in use have a means for preventing the evolution of hydrogen from the negative electrode during charge. If hydrogen gas evolves during charge, the hydrogen remains in the battery as it is, though only an extremely small proportion thereof is absorbed on the positive electrode. As a result, accumulation of hydrogen occurs, leading to lowering the partial pressure of oxygen and, hence, making the reaction for absorption of oxygen gas difficult to take place. In this case, when the inner pressure has reached to a value at which the safety valve operates, not only hydrogen gas but also oxygen gas are released from the valve. This means a decrease in amount of the electrolyte and leads to a decrease in capacity. Further, the evolution of hydrogen gas is undesirable also from the viewpoint of safety.

As a specific means for prevention of the evolution of hydrogen gas, generally employed is a method in which an excess of cadmium hydroxide, called cadmium hydroxide for reserve, is fixed besides an active material incorporated in an amount in proportion to the capacity of the positive electrode.

The amount of the excess cadmium hydroxide should be such that it can compensate at least the following main items:

(a) the amount of the positive active material increased by the formation of nickel hydroxide, which is the same as the active material, resulting from the oxidation of a nickel substrate or the like, which is a support for the active material, through charge and discharge;

(b) the amount of the oxygen which is consumed in the decomposition of a separator after being generated during charge; and (c) the amount of oxygen in proportion to the product of an allowable inner pressure of the battery and a space volume of the battery.

In either case, cadmium hydroxide present in electrode is converted into metallic cadmium in an amount corresponding thereto. The amount of this cadmium hydroxide for reserve varies depending upon the separator material and the shape and use conditions of the battery, but it is generally 40 to 100% of the theoretical capacity of the positive active material. If expressed based on the weight of the positive active material, the content in the negative electrode of cadmium hydroxide including the cadmium hydroxide for reserve is usually from 1.77 to 2.53 times the amount of the positive active material. As described above, conventional batteries should contain an excess of cadmium hydroxide in amounts in proportion to or larger than the amounts of the active materials of the positive electrode. This is not preferable from the viewpoint of battery capacity, but is a necessary means for prevention of the evolution of hydrogen from the negative electrode. This means that the easy method of controlling the charge of the sealed-type lead storage battery only by detecting a rise in charging voltage is not practically applicable to the charge of the nickel-cadmium battery.

Under these circumstances, there has been proposed a method in which a negative-limited cell is prepared by the use of a cadmium negative electrode employing a collector of iron or cadmium, and a change in voltage during charge is detected. This method is reported in *9th Intersociety Energy Conversion Engineering Conference Proceedings*, p881 (1974). However, this battery has a drawback that its capacity decreases greatly with a lapse of charge-discharge cycle, and this phenomenon becomes remarkable especially at a temperature as low as 0° C. or as high as 40° C.

On the other hand, in a positive-limited cell employing a positive electrode comprising, as main components of its active material, hydroxides having a cobalt content of 15 to 85 wt% based on the sum of nickel and cobalt and a negative electrode comprising, as main components of its active material, cadmium hydroxide and metallic cadmium, by setting the cadmium hydroxide content in the negative electrode at 0.95 or smaller in terms of the weight ratio of the cadmium hydroxide to the positive active material, that is, by incorporating no cadmium hydroxide for reserve, a method for the control of charge by detecting a voltage increase during the charge, said method being regarded as difficult to be applied to the conventional nickel-cadmium battery can extremely easily be carried out. Further, there is no need for cadmium hydroxide for reserve, as different from conventional batteries. It has been suggested that, because of the above, this battery can be made to have a higher capacity, and not only a cylindrical battery but also rectangular one can be charged at a rate as high as 1C or higher, such a quick charge being almost impossible with conventional batteries (Unexamined Published Japanese Patent Application No. 63-250068).

However, besides the disadvantage of having difficulty in being charged at low temperatures, it has a drawback that the incorporation of cobalt in a large proportion in the active material of the positive electrode result in a high cost. Further, it has another disadvantage that th- control of charge is inferior to that for the lead storage battery, in view of the fact that the lead storage battery shows a rapid rise in the final stage of charge and the difference in voltage is as large as 600 mV.

It has become clear from the above that the method for the control of the constant-voltage charging of lead batteries is difficult to apply to nickel-cadmium batteries, and also a background thereof has become clear. The problems to be solved by the present invention will further be described below in detail with reference to sealed-type batteries as an example.

Like lead, cadmium is known as a metal showing a high hydrogen overvoltage. The control of the charge of the lead battery is generally performed by a method in which a potential change is detected until the potential reaches a value where hydrogen evolves from the negative electrode of lead; whereas in the case of the nickel-cadmium battery, generally employed is not a sealed battery for which the control of charge is done by detecting a potential change until the potential reaches a value where hydrogen evolves from the cadmium electrode, but a method in which a temperature change or potential change resulting from a gas-absorbing reaction on the cadmium electrode is detected. A chief reason for this is that since there is no need for the consideration of self-discharge, i.e., oxidation of cadmium in the negative electrode with evolution of hydrogen, there can be taken a means of allowing the oxygen generated on the positive electrode to be efficiently absorbed on the negative electrode by the use of a pressure-resistant vessel. On the other hand, as other reasons for that the method of taking an advantage of a high hydrogen overvoltage at the negative electrode to detect the potential change, as in the case of the lead battery, is not generally employed, the following may be mentioned.

(a) Since sealed-type batteries mainly employ a sintered nickel substrate for negative electrode, the hydrogen overvoltage becomes low.

(b) There is a problem in charge characteristics of cadmium hydroxide as the negative active material. That is, the charge efficiency of cadmium hydroxide becomes low especially when charging is performed at low temperatures or at high rates, and the time when hydrogen evolves varies. Furthermore, particles of cadmium hydroxide become larger with the progress of charge-discharge cycle, resulting in low charge efficiency.

(c) The discharge capacity of cadmium as the negative active material highly depends upon the discharge rate.

DISCLOSURE OF THE INVENTION

An object of the present invention is to develop a reliable alkaline battery which can be quickly charged by a simple me hod in which the charging is controlled only by detecting a rise in charging voltage, and another object is to provide an alkaline storage battery in which a cadmium negative electrode plate containing at least nickel hydroxide or nickel oxide as a negative active material is employed and the content of cadmium hydroxide in the negative active material has been set at a value in proportion to the capacity of the positive active material, i.e., the evolution of hydrogen on the negative electrode has been made to occur just before or before completion of the charge of the positive electrode and, owing to the above, which shows an extremely large and sharp change in charging voltage as compared with conventional alkaline storage batteries. According to the present invention, ultraquick charging of 1C or more is possible.

BEST MODES FOR CARRYING OUT THE INVENTION

Figure 2:
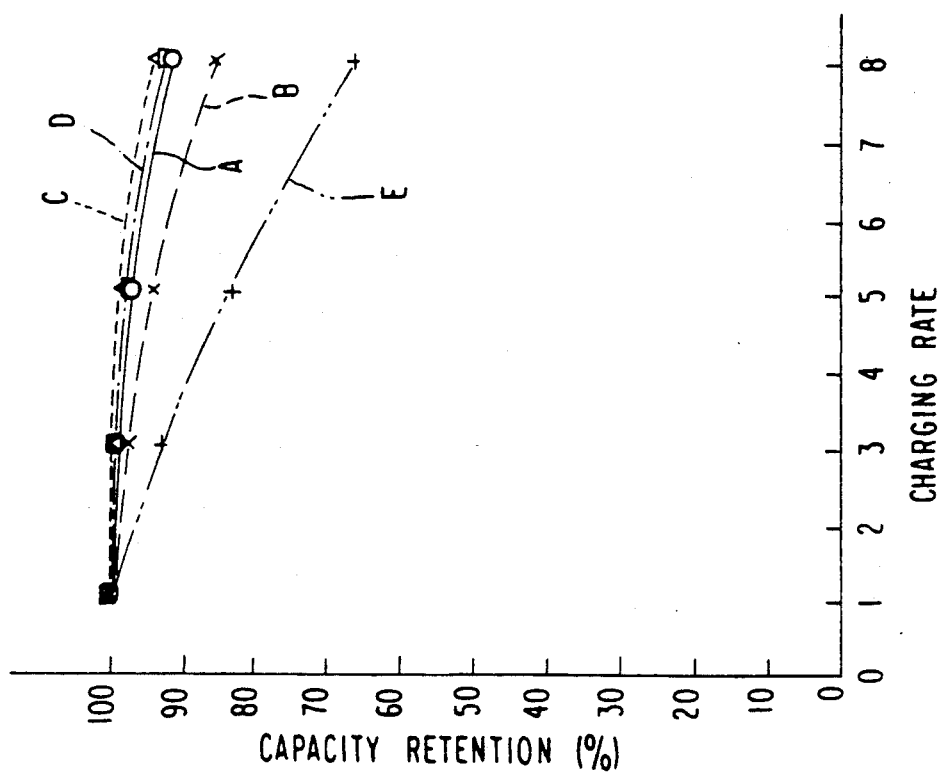
FIG. 2 shows a comparison between nickel-cadmium batteries made in accordance with the invention and a conventional battery with respect to capacity retention which varies depending upon the change in charging rate.

The present invention will now be describes below in detail by means of preferred examples.

As positive active materials which can be used for alkaline batteries of this invention, there may be mentioned nickel hydroxide, manganese dioxide, and silver oxide. However, since the active material most widely employed is nickel hydroxide, the following explanation will be made mainly with reference to nickel-cadmium batteries.

EXAMPLE 1

A sintered nickel substrate having a porosity of about 80% was impregnated with an aqueous mixed solution [pH: 2, specific gravity; 1.5 (20° C.)] of cobalt nitrate and nickel nitrate with a cobalt content of 8%. Thereafter, the resulting plate was immersed in an aqueous sodium hydroxide solution having a specific gravity of 1.200 (20° C.), washed with warm water, and then dried. This procedure was repeated, thereby preparing two positive electrodes having a theoretical capacity of 400 mAh and dimensions of 1.4×14×52 mm.

Further, 50 parts of a cadmium oxide powder, 50 parts of a metallic cadmium powder, 5 parts of nickel hydroxide, and 0.10 part of short fibers of polypropylene having a length of 1 mm were mixed with each other together with 30 ml of ethylene glycol containing 1.5 wt % polyvinyl alcohol, to obtain a paste. This paste was applied onto a perforated steel plate which had been plated with 10 μ-thick copper, and then dried and pressed, thereby preparing a negative electrode plate in which the cadmium oxide had a theoretical capacity of 960 mAh and which had dimensions of 2.9×14 ↑ mm.

Next, the above-obtained one negative electrode was wrapped by a 0.2 mm-thick nonwoven fabric of polyamide, and subsequently interposed between the two positive electrodes, and then using 2.4 ml of an aqueous potassium hydroxide solution having a specific gravity of 1.250 (20° C.) as an electrolyte, there was prepared a nickel-cadmium battery A employing a synthetic resin battery case having a nominal capacity of 700 mAh. It had external dimensions of 67×16.5×8 mm. This battery is equipped with a safety valve operating at 0.1 kg/cm². This battery has almost no cadmium hydroxide for reserve. The cadmium hydroxide content in the negative electrode in the discharged state is about 0.95 time the content of nickel hydroxide in the positive plates. In this case, cadmium oxide in the negative electrode participates in the reaction as shown by equation (3), which takes place upon introduction of the electrolyte, and water is consumed. Therefore, excess water was incorporated in an amount corresponding to that thus consumed.

$$CdO + H_2O \rightarrow Cd(OH)_2 \quad (3)$$

EXAMPLE 2

A sintered nickel substrate having a porosity of about 80% was impregnated with an aqueous mixed solution [pH: 2, specific gravity: 1.5 (20° C.)] of cobalt nitrate and nickel nitrate with a cobalt content of 15%. Then, the substrate was heat-treated at 220° C. for 1 hour. Subsequently, the resulting substrate was immersed in an aqueous sodium hydroxide solution having a specific gravity of 1.200 (20° C.), washed with warm water, and then dried. This procedure was repeated, thereby preparing two positive electrode plates having a theoretical capacity of 400 mAh and dimensions of 1.4×14×52 mm.

Further, 50 parts of a cadmium hydroxide powder, 50 parts of a metallic cadmium powder, 5 parts of nickel oxide, and 0.15 part of short fibers of polyvinyl alcohol having a length of 1 mm were mixed with each other together with 30 ml of water containing 0.1 wt % polyvinyl alcohol, to obtain a paste. This paste was applied onto an expanded metal of copper and then dried and pressed, thereby preparing a negative electrode in which the cadmium hydroxide had a theoretical capacity of 960 mAh and which had dimensions of 2.9×14×52 mm. Using these positive electrodes and negative electrodes, there was prepared a rectangular nickel-cadmium battery B which had the same construction as that in Example 1 and had a nominal capacity of 700 mAh.

This negative electrode has almost no cadmium hydroxide for reserve, and the cadmium hydroxide content in the negative electrode plate in the discharged state is about 0.95 time the content of nickel hydroxide in the positive electrode plates, i.e., [(0.960×0.289)/(0.366×0.800)].

EXAMPLE 3

An aqueous mixed solution [pH: 2, specific gravity: 1.600 (20° C.)] of cobalt mixture and nickel nitrate with a cobalt content of 20% was heat-treated at 220° C. for 2 hours. Subsequently, it was immersed in an aqueous sodium hydroxide solution having a specific gravity of 1.200 (20° C.) for 2 hours, washed with warm water, and then hot-air dried at 120° C. for 1 hour. Thereafter, it was pulverized into a 80-mesh or finer powder with a ball mill. 95 parts of this powder as a positive active material and 5 parts of a metallic cobalt powder as a conductive material were kneaded together with 40 ml of ethylene glycol. The kneaded mixture was plastered into 2 mm-thick foamed nickel (a trade name "Cermets", manufactured by Sumitomo Electric Industries, Ltd.) and dried at 150° C. for 1 hour. Thereafter, the dried product was pressed, thereby preparing two positive electrodes having a theoretical capacity of 400 mAh and dimensions of 1.4×14×52 mm.

Further, 100 parts of a cadmium oxide powder, 10 parts of a nickel hydroxide powder, and 0.10 part of short fibers of polypropylene having a length of 1 mm were mixed with each other together with 40 ml of a 1.5 wt % aqueous solution of polyvinyl alcohol, to obtain a paste. This paste was plastered into 3 mm-thick foamed copper and then dried and pressed, thereby preparing a negative electrode in which the cadmium hydroxide had a theoretical capacity of 500 mAh and which had dimensions of 2.9×14×52 mm.

Next, the above-obtained one negative electrode was wrapped by a 2 mm-thick nonwoven fabric of polypropylene and subsequently interposed between the two positive electrodes, and then using 2.4 ml of an aqueous potassium hydroxide solution having a specific gravity of 1.300 (20° C.) as an electrolyte, there was prepared a rectangular nickel-cadmium battery C employing a synthetic resin battery case having a nominal capacity of 500 mAh. Its external dimensions, etc. are the same as those in Example 1. The cadmium hydroxide content in the negative electrode in the discharged state of the battery, based on the content of nickel hydroxide in the positive electrodes, is 0.49, i.e., [(0.500×0.289)/(0.366×0.800)].

As in Example 1, excess water is added in an amount required in order that cadmium oxide in the negative electrode plate changes into cadmium hydroxide by the action of the electrolyte.

EXAMPLE 4

Impregnation with an aqueous mixed solution [pH: 2, specific gravity: 1.600 (20° C.)] of cobalt nitrate and nickel nitrate with a cobalt content of 20% was performed, followed by a heat treatment at 250° C. for 2 hours. Subsequently, it was immersed in an aqueous sodium hydroxide solution having a specific gravity of 1.200 (20° C.) for 2 hours, washed with warm water, and then hot-air dried at 120° C. for 1 hour. Thereafter, the resulting dried product was pulverized into a 80-mesh or finer powder with a ball mill. 95 parts of this powder as an active material and 5 parts of a metal cobalt powder as a conductive material were kneaded together with 50 ml of a 1 wt % aqueous solution of carboxymethyl cellulose. The kneaded mixture was impregnated directly into 3 mm-thick foamed nickel (a trade name "Cermets", manufactured by Sumitomo Electric Industries Ltd.) and dried at 150° C. for 1 hour. Thereafter, the dried product was pressed, thereby preparing two positive electrode plates having a theoretical capacity of 400 mAh and dimensions of 1.4×14×52 mm. Further, the plates were charged in an aqueous potassium hydroxide solution having a specific gravity of 1.200 (20° C.) at 600 mA for 2 hours, and then discharged to 0 V (vs. Hg/HgO) with the same electric current. Thereafter, the resulting electrodes were washed with warm water and dried, thereby obtaining positive electrodes.

Meanwhile, 50 parts of a cadmium oxide powder, 30 parts of a metallic cadmium powder, 10 parts of a nickel hydroxide powder, 0.15 part of short fibers of polypropylene having a length of 1 mm, and 3 parts of a polytetrafluoroethylene powder were mixed on both sides of a 20-mesh nickel net by directly pressing the mixture by means of a roller, thereby preparing a negative electrode in which the cadmium oxide had a theoretical capacity of 800 mAh and which had dimensions of 2.9×14×52 mm. Using these positive electrodes and negative electrode, there was prepared a rectangular nickel (cobalt)-cadmium battery D according to the present invention which had the same construction as that in Example 2 and had a nominal capacity of 700 mAh.

In this case, the content of cadmium hydroxide just after the assembly is 0.79 time the amount of nickel hydroxide as the positive active material, i.e., [(0.800×0.289)/(0.366×0.800)].

As in Example 2, excess water was added in an amount required in order that cadmium oxide in the negative electrode changes into cadmium hydroxide by the reaction of the electrolyte. There is almost no cadmium hydroxide for reserve of the present invention.

Figure 1:
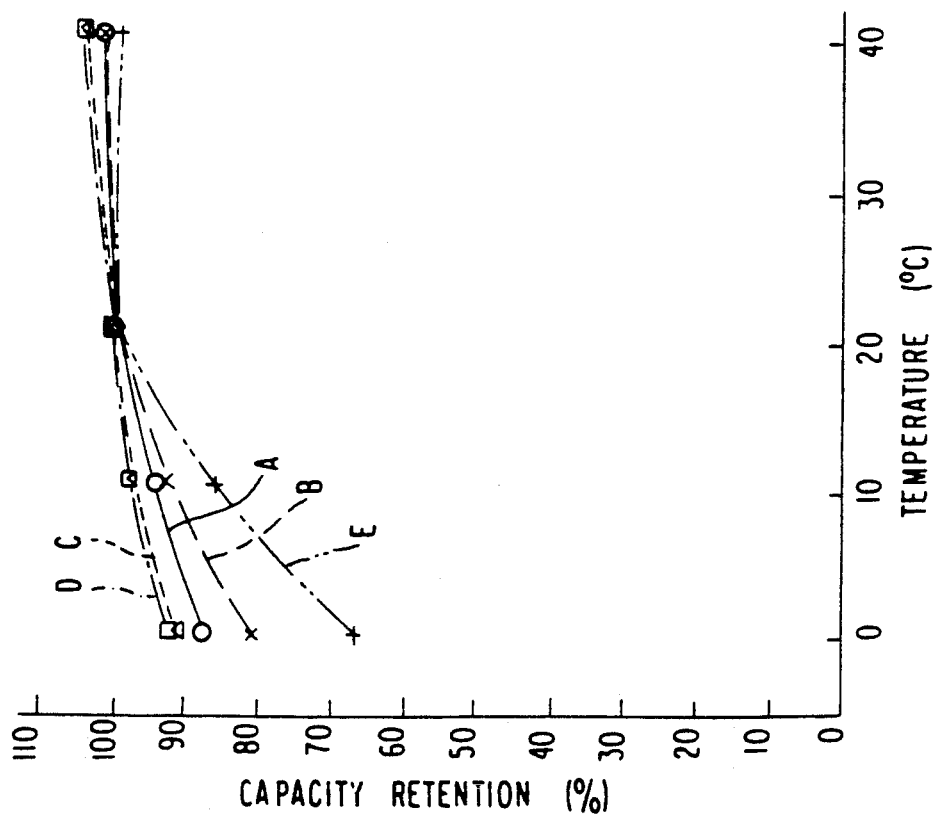
FIG. 1 shows a comparison between nickel-cadmium batteries made in accordance with the invention and a conventional battery with respect to the change in capacity retention with temperature

Next, each of the batteries was subjected, at 20° C., 10° C., 20° C. and 20° C., to a charge-discharge treatment in which each battery was charged by applying an electric current of a maximum of 5 C at a constant voltage of 1.90 V for 30 minutes and then discharged to 0.5 V at 0.2 C. Capacity retentions for respective temperatures are shown in FIG. 1, with the discharge capacities for 20° C. being taken as 100. For comparison, the same test was performed on a rectangular nickel-cadmium battery E which had a nominal capacity of 700 mAh and had the same construction as that in Example 1 except that the negative active material was composed of a mixed powder consisting of two components of 50 parts of a cadmium oxide powder and 50 parts of a metallic cadmium powder and 0.1 part of short fibers of polypropylene having a length of 1 mm and that a nickel-plated perforated steel was used. The results are shown in this figure.

From FIG. 1, it can be seen that even at a temperature as low as 0° C., the capacities of batteries A, B, C and D according to the present invention are 80% or more of the capacities at 20° C., whereas the conventional battery E shows a greatly decreased capacity at 0° C.

Generally used nickel-cadmium batteries have large amounts of cadmium hydroxide for reserve in the negative electrodes, as different from the case of batteries A to E which contain small amounts of cadmium hydroxide for reserve. Therefore, a battery F was prepared in the same manner as in Example 1 except that use was made of a negative electrode containing cadmium hydroxide in an amount 1.6 times the theoretical capacity of the positive electrode, and it was charged at 5 CA until the voltage reached to 1.9 V. However, it was necessary to overcharge the battery by an amount as large as 80% of its nominal capacity until the voltage reached to 1.9 V. In addition, it was decreased in weight by 100 mg and leakage of the electrolyte from the safety valve was observed. It can be understood from the above that where a negative electrode containing an increased amount of cadmium hydroxide for reserve is used, the effect of showing a great rise of the charging voltage as in the battery of the present invention cannot easily be obtained. However, if overcharge is continued, the amount of the cadmium hydroxide for reserve will decrease in course of time, thereby producing the effect of the present invention.

Next, the batteries were charged to 1.9 V at 20° C. at a constant current, with the charging rate being varied, and then discharged to 0.5 V at 0.2° C. Capacity retentions for respective charging rates are shown in FIG. 2 based on the discharge capacities for 1 C charge. This figure shows that even when the charging rates are high, batteries A, B, C and D according to the present invention suffer only slight decreases in discharge capacity as compared with the conventional battery E. That is, it is possible to perform quick charge at a rate of 1 C or higher and especially, superquick charge at 3 C or higher. The batteries of the present invention are attributable to not only a large difference between the voltage during charge and the voltage in the final stage of the charge, but also particles of the negative active materials. The reason for this will be described later.

Figure 3:
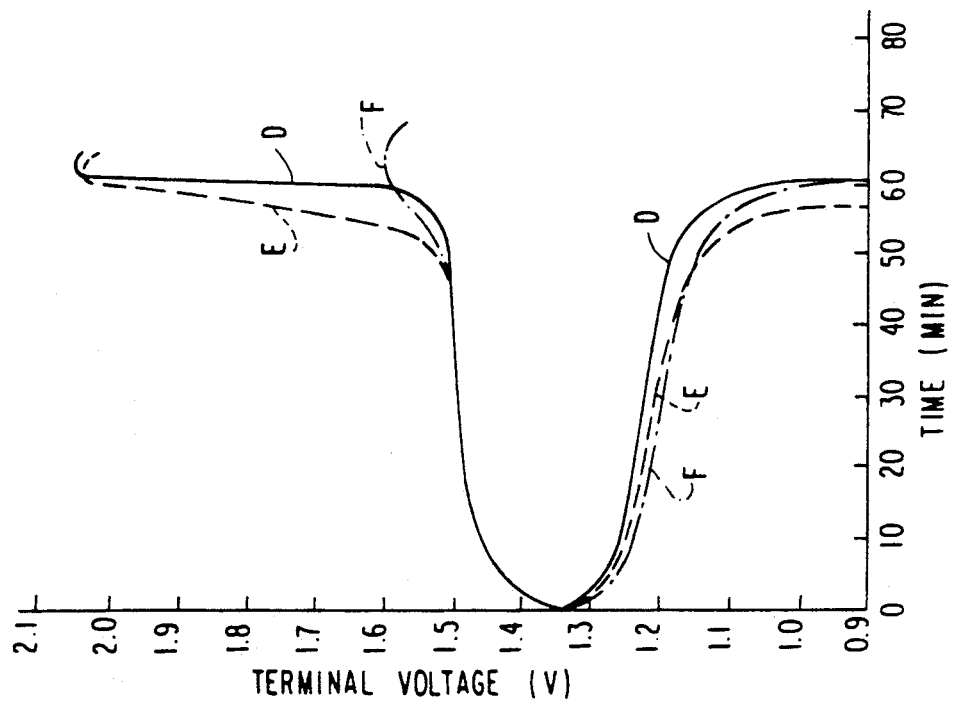
FIG. 3 shows a comparison between a nickel-cadmium battery made in accordance with the invention and conventional batteries with respect to charge and discharge characteristics.

Subsequently, battery D of the present invention, the conventionally proposed battery E and a generally-used conventional battery F were charged at 1 C for 64 minutes and then discharged at 1 C. Representative charge and discharge characteristics are shown in FIG. 3. This figure shows that the charge characteristics of battery D according to the present invention are characterized in that the voltage is increased rapidly in the final stage of charge, i.e., characterized by an abrupt change in voltage. In the case of the conventionally proposed battery E, a rapid increase in voltage was observed in the final stage of charge, but this voltage change is not so sharp and occurs too early, as compared with battery D according to the present invention. However, in the case of the conventional nickel-cadmium battery F, the value to which the voltage increases in the final stage of charge is very low and its charge is also extremely small. With respect to discharge characteristics, on the other hand, it can be understood that the discharge voltage characteristics of battery D of the present invention is good as compared with the conventional batteries E and F, especially the battery F. The reason why the battery of the present invention shows a considerably large and sharp change in voltage in the final stage of charge as described above is thought to be that the cadmium hydroxide in the negative electrode can be uniformly charged because nickel hydroxide has been incorporated in the active material. The reason why the discharge voltage characteristics are excellent is believed to be that the discharge reaction takes place more uniformly because the negative electrode contains almost no cadmium hydroxide for reserve at the end of charge, i.e., the negative electrode plate mostly consists of metal cadmium, and hence its electrical resistance is low. Particularly, since battery D of the present invention employs a negative electrode containing powdery nickel hydroxide as an active material, it can be though that for that reason, particles of the metallic cadmium powder generated during charge becomes small so that the charge and discharge characteristics are improved.

Next, in order to make characteristic features of the present invention and its effects clear, the potential behaviors of the negative electrodes were studied in detail, which is a main point for the present invention.

Figure 4:
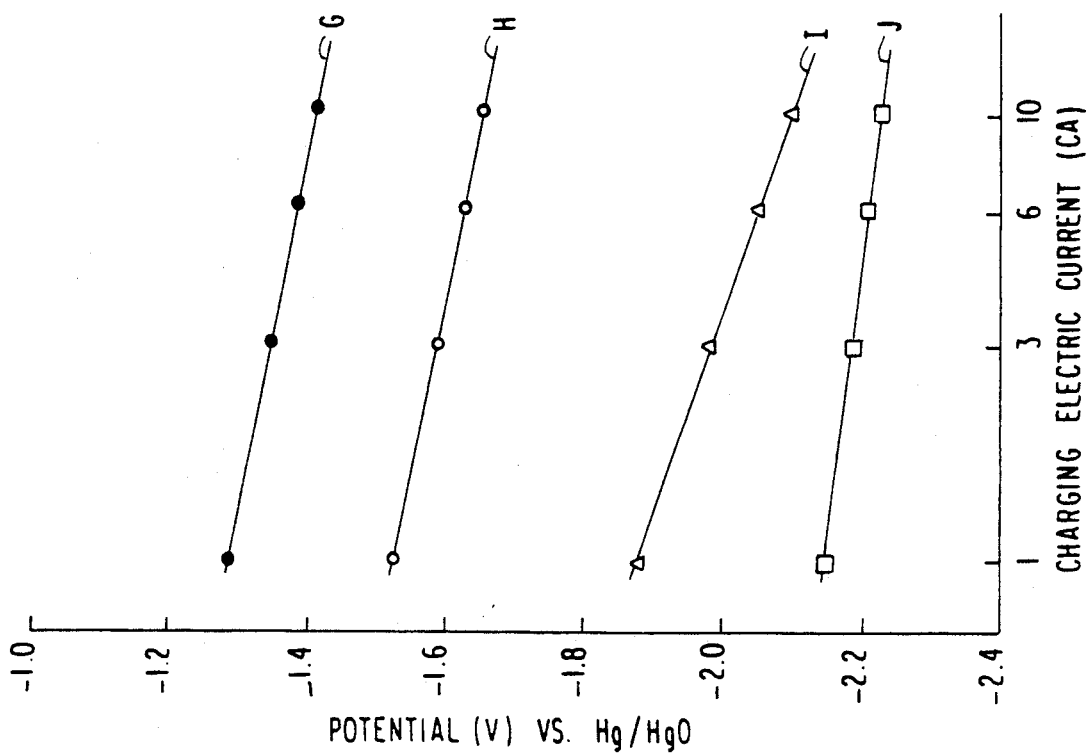
FIG. 4 shows a comparison in polarization characteristics of collectors to be used in batteries according to the invention.
Figure 5:
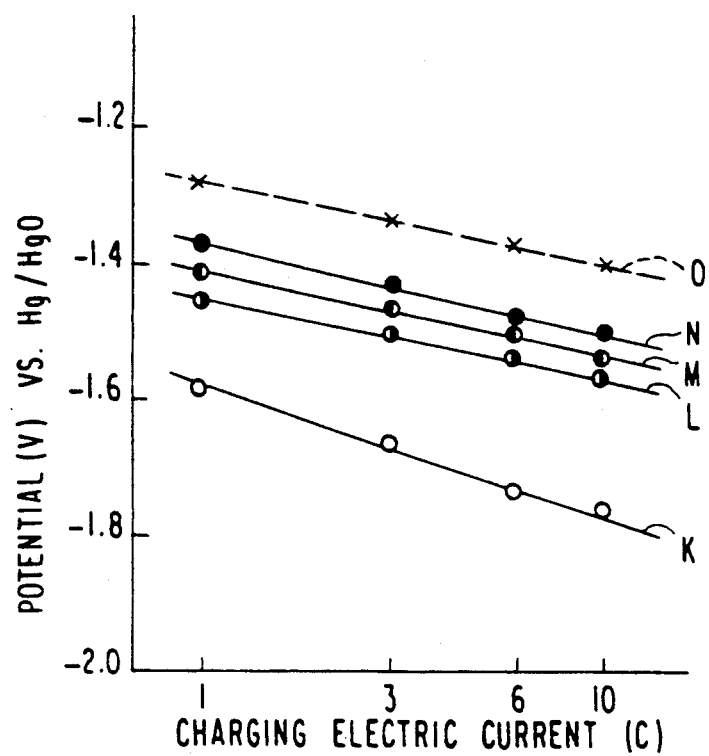
FIG. 5 shows a comparison between negative electrodes made in accordance with the invention and a conventional negative electrode with respect to polarization characteristics of hydrogen evolution.
Figure 6:
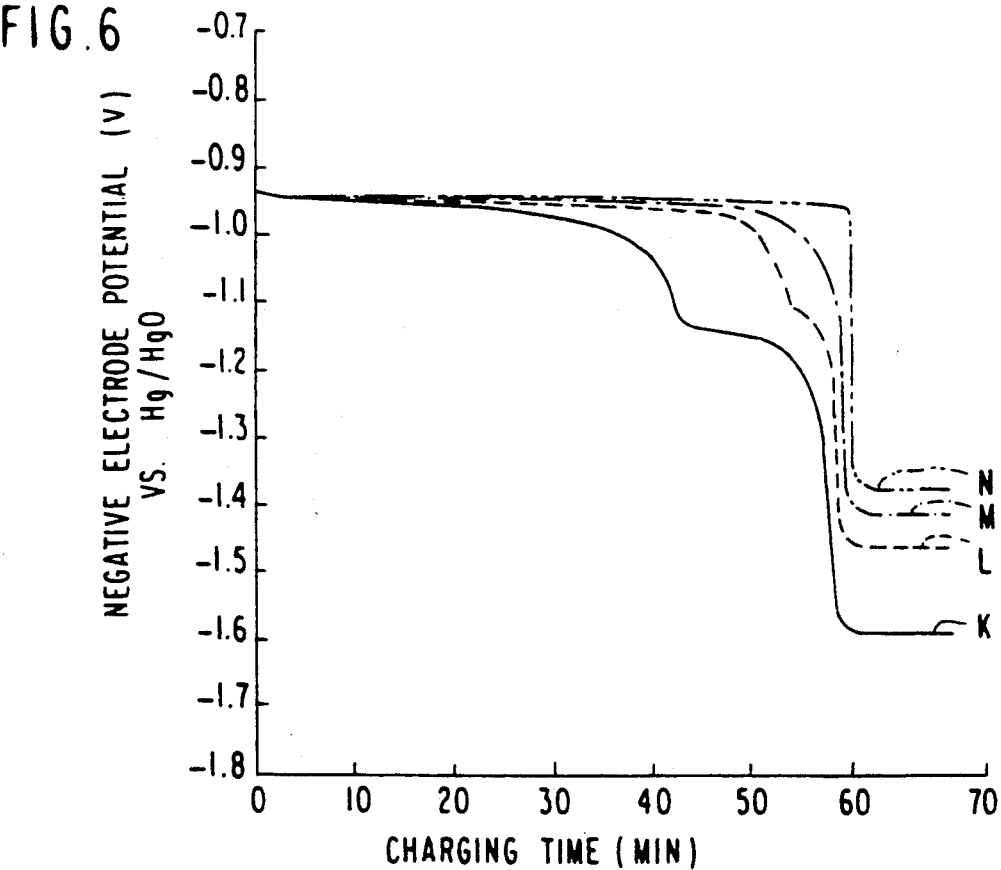
FIG. 6 shows charging potential characteristics of negative electrodes according to the present invention.

First, in order to examine the influence of collector materials, cathode polarization characteristics were evaluated in an aqueous KOH solution having a specific gravity of 1.250 (20° C.) using 0.2 mm$\phi$ 20-mesh nets of nickel G, copper H, cadmium I, and amalgam-treated copper J. The results are shown in FIG. 4. From this figure, Tafel's b coefficients are 0.110 V, 0.12 V, 0.235 V and 0.06 V, respectively, and these values except for those for nickel and copper are considerably different from the conventional value, 0.12 V, which has been obtained using smooth metals. It should be noted from these results that the collector of copper, cadmium or amalgam-treated copper, which is employed in the present invention, shows a high hydrogen overvoltage as compared with collectors of nickel employed in nickel-cadmium batteries. Subsequently, 50 parts of a cadmium oxide powder and 50 parts of a cadmium powder were mixed with various amounts of a nickel hydroxide powder, and the mixtures were press-molded at a pressure of 230 kg/cm$^2$ and then wrapped by 20-mesh copper nets, thereby preparing negative electrodes. The cathode polarization characteristics of these negative electrode plates were examined and the results are shown in FIG. 5, wherein K, L, M and N indicate the plates in which the contents of nickel hydroxide powder based on the total amount of metallic cadmium in the metallic cadmium and cadmium compounds contained in the respective electrode plates are 0, 5, 10 and 20% ((Ni(OH)$_2$/Cd) $\times$100), respectively. For comparison, the polarization characteristics of an electrode plate into which a 5 wt % nickel powder, conventionally used as an additive for negative electrodes, has been incorporated are shown as O. This figure shows that the incorporation of nickel hydroxide decreases the hydrogen overvoltage, but the thus decreased values are clearly higher than those for the conventional electrode employing a nickel powder. Further, values for Tafel's b coefficient are 190 mv in the case where no nickel hydroxide has been incorporated, and 115 to 120 mV in the case where nickel hydroxide and a nickel powder have been incorporated. The latter value is almost in agreement with the values obtained with conventional smooth electrodes. One of the characteristic features of the present invention is that the control of charge is performed by detecting a potential change leads to the evolution of hydrogen from the negative electrode during charge, as a change in terminal voltage of the battery. Therefore, the mode of the voltage change during charge is extremely important. The same negative electrodes as those used in the experiment for FIG. 5 were prepared and charged at 1C using an aqueous potassium hydroxide solution having a specific gravity of 1.250 (20° C.), and the charging potential characteristics are shown in FIG. 6. This figure shows that in the case where the nickel hydroxide powder content is 0 wt%, the potential changes in the final stage of charge in two stages; the first-stage change becomes small with the increase in nickel hydroxide content; and where the content is 5 wt % or higher, especially 10 wt % or higher, the first-stage potential disappears and the potential change until the hydrogen evolution potential in the final stage of charge becomes abrupt, i.e., the change becomes sharp. Therefore, from the viewpoint of the mode of potential change, it can be understood that the amount of nickel hydroxide incorporated is preferably 5 wt % or higher, more preferably 10 wt % or higher, based on the total amount of cadmium.

Further, another advantage of the incorporation of nickel hydroxide was found. This advantage is that although the addition of nickel hydroxide decreases the hydrogen overvoltage, making the evolution of hydrogen easy, the ability to accept charge until hydrogen generates, i.e., charge efficiency, is greatly improved especially when charge is effected quickly.

The same negative electrodes as those used in the experiment for FIG. 5 were charged at 1C and 10C, and their charge efficiencies were calculated from the amounts of electricity fed until the evolution of hydrogen was observed and from the theoretical capacity values of the cadmium hydroxide in the negative electrode plates, according to the following equation.

$$\text{Charge Efficiency} = \frac{\text{Amount of electricity input until evolution of hydrogen}}{\text{Theoretical cadmium hydroxide capacity}} \times 100\%$$

The results are shown in Table 1. The charging electric currents are based on the theoretical capacities of the cadmium hydroxide contained in the negative electrodes.

TABLE 1

| Nickel Hydroxide Content | Charge Efficiency (%) | |
|---|---|---|
| (wt %) | 1C | 10C |
| 0 | 93.1 | 85.0 |
| 2 | 97.5 | 90.2 |
| 5 | 99.5 | 91.0 |
| 10 | 99.6 | 92.2 |
| 20 | 99.8 | 97.0 |
| 50 | 99.9 | 98.0 |
| 60 | 100 | 99.0 |

Table 1 shows that the charge efficiency value increases as the nickel hydroxide content increases. Particularly, in the case of superquick charge such as that at 10 C, the incorporation of nickel hydroxide is very effective; the charge efficiency is 85.0% with no nickel hydroxide but it is improved to 90.2% by 2 wt % incorporation of nickel hydroxide. Such incorporation of nickel hydroxide has been known as the antipolar method since before. However, practically employed is not this method but a method in which cadmium hydroxide is incorporated in active materials of nickel hydroxide positive electrodes which are a capacity-limiting electrode. Purposes of the incorporation of nickel hydroxide in negative active materials may, in some cases, be to prevent the deterioration of metallic cadmium due to aging and to improve its durability, as described in Examined Japanese Patent Publication 57-37986 and U.S. Pat. 4,689,880, but virtually the purpose is to increase the utilization of negative active materials, and the amount is usually in the range of from 0.1 to 5%. However, in order to increase utilization, metallic nickel rather than nickel hydroxide is normally incorporated, is reported in *Denki Kacaku*, 30, 479 (1962), with the amount being in the range of from 0.2 to 20%. In the case of the batteries of the present invention, the addition of nickel is disadvantageous because the evolution of hydrogen occurs very easily. It can be said that by the incorporation of 2 wt % or more of nickel hydroxide, the charge efficiency in quick charge at 1 C or a higher rate, especially 10 C, can be improved. This is because the nickel hydroxide acts as a nucleus to prevent the increase in the size of cadmium hydroxide generated during discharge and, at the same time, to prevent the increase in the size of metallic cadmium generated during charge. As described above, although the addition of nickel hydroxide results in a low hydrogen overvoltage as compared with the case of no addition, the incorporation is advantageous in that the charge efficiency is greatly improved and the potential change in the final stage of charge occurs suddenly in one stage. In view of actual uses of the battery, a practically preferred nickel hydroxide content is 2 wt % or more, especially from 5 to 60 wt %, since the battery capacity itself becomes small when the content is high. As an additive producing the same effect as that brought about by powdery nickel hydroxide, there was a nickel oxide powder. An experiment was made in which a nickel hydroxide powder was heated at 410° C. for 1 hour to give nickel oxide, which was then examined in the same manner as in the case of the nickel hydroxide powder. The relationship between the amount of nickel oxide incorporated and the charge efficiencies at 1 C and 10 C is shown in Table 2. It can be seen that nickel oxide has the same effect as that produced by nickel hydroxide. A preferred amount of nickel oxide incorporated is from 2 to 60 wt %. In this case, where metallic nickel was used in place of nickel oxide, the evolution of hydrogen gas began even in the beginning of charge at 10 C, making the charge very difficult.

The nickel hydroxide particles used were spherical ones having an average particle diameter of 10 μ, but preferred were spherical fine particles having a particle diameter of 50 μ or less. Further, a mixture of a nickel hydroxide powder and a nickel oxide powder was also evaluated, and it produced almost the same effect.

TABLE 2

| Nickel oxide Content | Charge Efficiency (%) | |
|---|---|---|
| (wt %) | 1C | 10C |
| 0 | 93.1 | 85.0 |
| 2 | 96.0 | 87.5 |
| 5 | 98.0 | 89.7 |
| 10 | 98.2 | 89.9 |
| 20 | 98.5 | 92.0 |
| 50 | 99.0 | 94.0 |
| 60 | 98.7 | 95.0 |

The above-described evaluation of the effect of the incorporation of powdery nickel hydroxide and nickel oxide was done with the ratio of cadmium hydroxide to metallic cadmium being 1:1. The principle of the present invention holds even where the content of metallic cadmium becomes low or it is been replaced by powdery cadmium hydroxide. However, in the case where no metallic cadmium is included, the first charge should be performed at a low charging rate of 0.2 C or lower, and if the electric current exceeds the limits, the evolution of hydrogen disadvantageously begins from the beginning of the charge. Therefore, it is preferable that the metallic cadmium content be 5 wt % or more, and it was found that preferably employed as the metallic cadmium was then produced by an electrolytic process or an electrochemical substitution process and having a small particle diameter rather than one produced by an atomization process. Further, in the case where a copper material is applied on the surface, it is preferable in an actual battery system that the capacity is limited by the positive electrode during discharge. This is because if the capacity is limited by the negative electrode, copper is dissolved in the electrolyte, and this copper deposits in a resin-like state on the negative electrode during the subsequent charge, which extends through the separator and causes a short circuit to occur easily.

Generally, it is preferable that the batteries according to the present invention be made to be limited by the negative electrodes during charge and limited by the positive electrodes during discharge. Further, as separators, nonwoven fabrics of nylon or polypropylene were used in the Examples of this invention, but it is preferable to use an oxidation-resistant separator, such as that made of polypropylene, which does not suffer oxidation by oxygen generated from positive electrodes during charge, since the fluctuation of the amount of cadmium hydroxide in the negative electrodes due to charge and discharge becomes small. In this case, use of a positive electrode plate employing an active material having a good Coulomb efficiency is advantageous not only in that the amount of oxygen evolving during charge is low and deterioration of the separator is little, but also from the viewpoint of charge control. That is, when a positive electrode plate having an ampere-hour efficiency of almost 100% is employed, the charging can be completed only by detecting a change in the charging potential of the battery based on the potential change of the negative electrode, and then stopping the charge. In the case where a positive electrode plate having a low Coulomb efficiency is employed, the oxygen gas generated from the positive electrode should be absorbed on the negative electrode according to equation (2), whereby the charging requires a longer time. Furthermore, since a high charging rate also results in a low charge efficiency of cadmium hydroxide, it is required to perform overcharge by continuing the charge at a constant voltage or at a small and constant electric current after a change in charging voltage is detected. As a positive electrode plate having a good Coulomb efficiency, nickel hydroxide positive electrode plates containing cobalt hydroxide as an active material in an amount of 15 to 85 wt % (Co/(Ni+Co) ×100) may be used.

As a charging method, there may be employed a constant-voltage charging method in which a maximum electric current is regulated; a quasi-constant-voltage charging method which employs a leakage transformer as a main transformer; a two-stage constant-electric current method in which charging is performed at a constant electric current until a change in voltage is detected, and then overcharge is performed at a small electric current; or a charging method which is a combination of these charging methods and a timer. That is, charging methods simpler than the change in temperature increase due to gas-absorbing reactions and the $-\Delta V$ method can be employed, as in the case of conventional nickel-cadmium batteries. The charging method is highly reliable since the voltage change during charge is extremely large, and superquick charge at 1 C or quicker, such as 5 C or 10C, is feasible. As described above, the feature of the present invention is effectively produced by a proper ratio of the positive active material and the negative active material and, hence, a detailed explanation will be given below in this respect.

The active materials of positive electrodes slightly differ depending upon the preparation conditions and also depending upon the conditions for formation effected before the assembly of batteries, but all of the contents may virtually be regarded as $Ni(Co)(OH)_2$. The active materials of negative electrodes in the discharged state may also virtually be regarded as cadmium hydroxide. At the time this positive active material changes, through charge, from 2 valency to 3.2 valency in terms of average valency, the charging is completed. On the other hand, during the time when the negative active material changes from 2 valency to 0 valency, no hydrogen gas generally evolves. Therefore, since the theoretical capacity of the positive active material is 0.3471 Ah/g and that of the cadmium hydroxide as the negative active material is 0.3662 Ah/g, an abrupt change in negative electrode potential will occur at or before the completion of charging from the positive electrode, if the content of cadmium hydroxide in the negative electrode is set at 0.95 or smaller in terms of the weight ratio of the cadmium hydroxide to the positive active material.

Where this relationship is satisfied, the battery shows a considerable change in charging voltage over a wide range of from $-30$ to $45°$ C., and detection of this change ensures easy control of the charge.

As described above, in the present invention, the amount of cadmium hydroxide in the negative electrode plate should be not larger than 0.95 time the amount of the positive active material. For doing this, the amount of cadmium hydroxide in the negative electrode plate should be controlled as already explained in the Examples. From the viewpoint of performance, it is preferable to control not only the amount of cadmium hydroxide but also the amount of metallic cadmium and, hence, the methods given in the Examples are not necessarily simple ones. Since the amount of this metallic cadmium need not be controlled so precisely as compared with the amount of cadmium hydroxide, the trouble can be eliminated by a method such as the following. That is, there may be employed a method in which the amount of cadmium hydroxide is set at 0 g, i.e., a battery is assembled using a negative electrode plate in its charged state. Illustratively stated, a negative electrode is overcharged in an aqueous alkaline solution, washed with warm water, and then dried in vacuum; or use is made of a paste-type negative electrode employing not a cadmium oxide powder or a cadmium hydroxide powder but a metallic cadmium powder as the active material. In this case, the positive electrode also needs to be in its charged state, and as a method for this, there may be employed a method in which the positive electrode, like the negative electrode, is charged in an aqueous alkaline solution, washed with warm water, and then dried, or it is oxidized with an oxidizing agent such as bromine, sodium hypochlorite or potassium peroxosulfate, washed with hot water, and then dried. Further, there may be employed another method in which a positive electrode plate and a negative electrode plate, both in their discharged states, are assembled into a battery, and the battery is overcharged and then sealed.

In these methods, the proportion of the amount of the active material of the negative electrode used to that of the active material of the positive electrode used may be any value, but after the battery has been sealed, the amounts satisfy the relationship mentioned hereinbefore, i.e., the content of cadmium hydroxide in the negative electrode is not larger than 0.95 time the amount of the positive active material in terms of weight ratio.

In the above, the figure of "0.95 time" is based on the amounts of the nickel hydroxide and cadmium hydroxide which participate in the charge of the positive active material and the negative active material, and in the case where an active material having an electrochemically low activity, such as large particles of nickel hydroxide or cadmium hydroxide, has been incorporated, it is needless to say that this figure will of course change. As described above, according to the present invention, there has been enabled quick charge which is simple and free from the necessity of temperature compensation but which has been difficult to attain with conventional nickel-cadmium batteries, by significantly reducing the amount of cadmium hydroxide for reserve as compared with the case of the conventional nickel-cadmium batteries, and detecting a change in charging voltage as a potential change until the evolution of hydrogen from the negative electrode, and owing to the high overvoltage.

The present invention has been explained hereinabove with reference to the use of nickel hydroxide as the positive active material, but the same effect as that obtained by the nickel-cadmium battery can also be produced by the use of manganese dioxide or silver oxide as the active material. This effect will be demonstrated by way of the following Examples.

EXAMPLE 5

80 parts of manganese dioxide ($\gamma$-$MnO_2$) and 10 parts of graphite were kneaded together with 30 ml of a 60 wt % aqueous dispersion of polytetrafluoroethylene powder. Thereafter, the kneaded mixture was formed into a sheet by means of a roller and applied on both sides of a 20-mesh nickel net with application of pressure, thereby preparing two positive electrodes having a theoretical capacity of 200 mAh and dimensions of $1.4 \times 14 \times 52$ mm. Further, 100 parts of a metallic cadmium powder, 5 parts of a nickel hydroxide powder, and 0.2 part of short fibers of polyvinyl alcohol having a length of 1 mm were mixed with each other together with 30 ml of propylene glycol. The resulting mixture was applied on an expanded metal of copper and dried, thereby preparing a negative electrode in which the total metallic cadmium had a theoretical capacity of 800 mAh and which had dimensions of $2.9 \times 14 \times 52$ $\mu$m. Next, this one negative electrode was wrapped by a 0.2 mm-thick nonwoven fabric of polyvinyl alcohol (a trade name "Vinylon", manufactured by Unichika Ltd.) and subsequently interposed between the two positive electrodes, and then using 2.7 ml of an aqueous potassium hydroxide solution having a specific gravity of 1.350 (20° C.) as an electrolyte, there was prepared a rectangular manganese dioxide-cadmium battery P of the present invention employing a synthetic resin battery case having a nominal capacity of 240 mAh. It has external dimensions of $67 \times 16.5 \times 8$ mm, and is equipped with a safety valve operating at 0.1 kg/cm$^2$. Further, a similar manganese dioxide-cadmium battery Q of the present invention was prepared in the same manner as in Example 5 except that a nickel-plated perforated steel was used as a collector for the negative electrode and an active material containing no nickel hydroxide was used.

Figure 7:
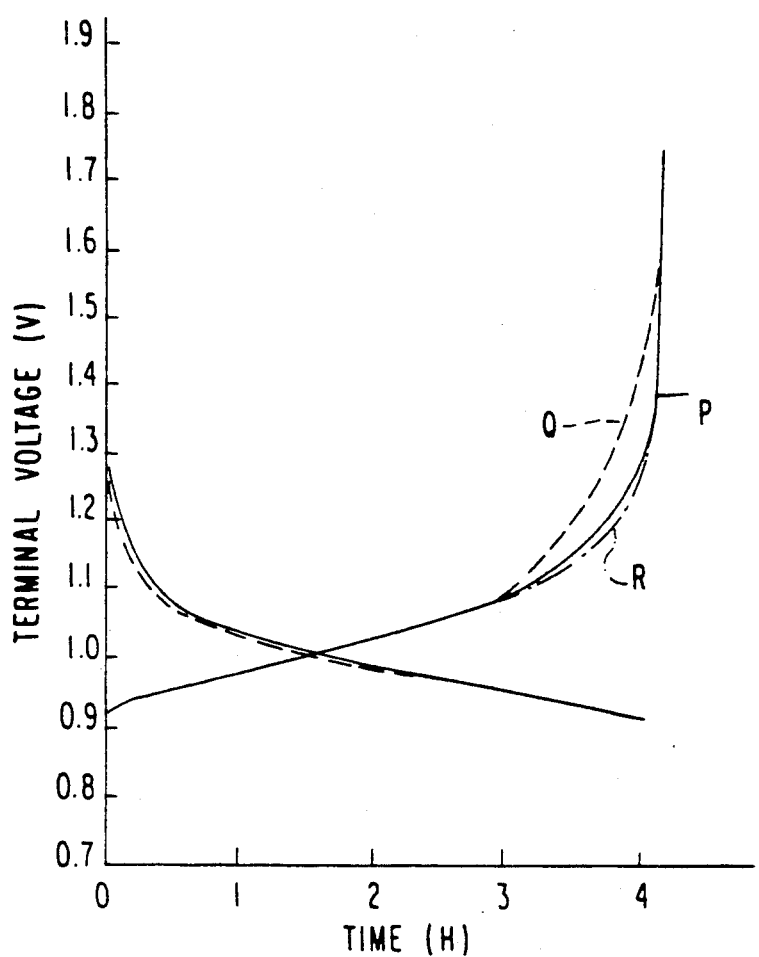
FIG. 7 shows a comparison between manganese dioxide-cadmium batteries made in accordance with the invention and a conventional battery with respect to charge and discharge characteristics.
Figure 8:
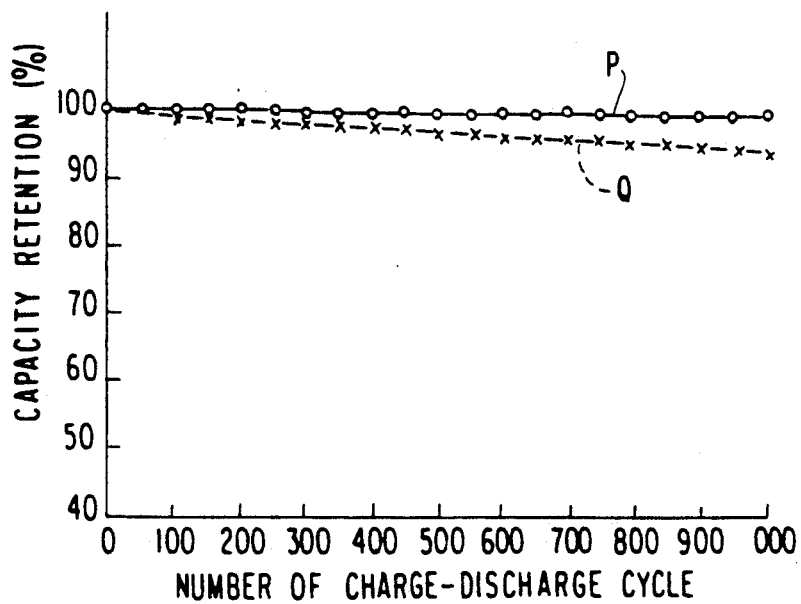
FIG. 8 shows the capacity retention of manganese dioxide-cadmium batteries made in accordance with the invention with the progress of charge-discharge cycle.

These batteries were discharged by 100 mAh at 20° C. at an electric current of 0.1 C and then charged at the same current. The thus-evaluated voltage characteristics during charge and discharge are shown in FIG. 7. For comparison, there are also shown the results on a manganese dioxide-cadmium battery R prepared in the same manner as in Example 5 except that a sintered negative electrode for conventional nickel-cadmium batteries, i.e., an electrode containing cadmium hydroxide for reserve, is used as a negative electrode. It can be seen from this figure that batteries P and Q according to the present invention show an abrupter and sharper rise in the final stage of charge than the conventional battery R. Further, the same batteries were discharged by 100 mAh at an electric current of 0.2 C and then charged to 1.6 V at the same electric current, and the resulting changes in capacity are shown in FIG. 8 on the basis of the discharge capacities at the first cycle. This figure shows that almost no decrease in discharge capacity is observed on the batteries P and Q of the present invention even at 1000 cycles. In contrast, in the case of the conventional battery R, the charge and discharge cycles could not be continued because the charging voltage could not reach to 1.6 V, resulting in overcharge and a very large decrease in capacity. This is because manganese dioxide was dissolved away as $MnO_4^2$ ions into the electrolyte due to the overcharge, the separator was deteriorated by the oxygen generated from the positive electrode, and oxygen leaked out of the battery, greatly decreasing the amount of the electrolyte. Further, a comparison between the batteries P and Q of the present invention showed that the former was better. This is thought to be because the charge efficiency of the negative active material of the former had been improved since the active material contained nickel hydroxide. In this Example, there was shown a case in which manganese dioxide was used as the positive active material and metallic cadmium as the negative active material, but the surface of a metallic cadmium powder is covered with a thin layer of its oxide, in many cases, and its discharging performance is slightly poor. Accordingly, the effect of the present invention can be further improved by incorporating in the negative electrode plate a small amount of a cadmium oxide powder or a cadmium hydroxide powder and incorporating nickel hydroxide in the manganese dioxide in an amount electrochemically corresponding to the amount of the powder. That is, this manganese dioxide-cadmium battery is first charged until the cadmium oxide or cadmium hydroxide in the negative electrode has been converted into metallic cadmium and then discharged, whereby the battery shows improved charge and discharge characteristics and life performance. In this case, a reaction which converts nickel hydroxide into nickel oxyhydroxide takes place on the positive electrode. Exactly speaking, at the time when an electrolyte has been introduced, the reaction of equation (4) takes place partly, but there is no problem in the battery system.

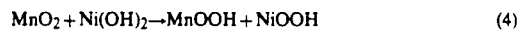

$$MnO_2 + Ni(OH)_2 \rightarrow MnOOH + NiOOH \qquad (4)$$

However, if the amount of nickel hydroxide becomes large, the discharge characteristics result in two-stage discharge characteristics in which manganese dioxide and nickel oxyhydroxide are reduced. Therefore, the amount of nickel hydroxide incorporated is preferably not large than 10 wt % of the amount of the manganese dioxide. In this case, a nickel hydroxide content of 1.05 or more (1/0.95) in terms of the weight ratio of nickel hydroxide to cadmium hydroxide will produce the effect of the present invention.

In this Example, manganese dioxide-cadmium batteries in which charge was limited by the negative electrodes and discharge was limited by the positive electrodes were prepared to explain its effect. However, a manganese dioxide-cadmium battery in which both charge and discharge are limited by the negative electrode has a more marked feature in its charging and discharging performance.

EXAMPLE 6

80 parts of manganese dioxide ($\gamma$-$MnO_2$) and 10 parts of graphite were kneaded together with 30 ml of a 60 wt % aqueous dispersion of polytetrafluoroethylene powder. Thereafter, the kneaded mixture was formed into a sheet by means of a roller. Subsequently, the sheet was applied on both sides of an expanded metal of nickel with application of pressure, thereby preparing two positive electrode plates having a theoretical capacity of 300 mAh and dimensions of $1.4 \times 14 \times 52$ mm. Further, 100 parts of a metallic cadmium powder, 2 wt % of nickel oxide, short fibers of polyvinyl alcohol having a length of 1 mm, and 1 part of a polyethylene powder were mixed with each other. Thereafter, the mixture was applied onto a cadmium-plated expanded metal of nickel with application of pressure, thereby preparing a negative electrode plate in which metallic cadmium had a theoretical capacity of 150 mAh and which had dimensions of $1 \times 14 \times 52$ mm. Next, the positive electrodes were wrapped by 0.5mm-thick nonwoven fabrics of polypropylene and by cellophane, and subsequently the negative electrode was interposed therebetween. Then, using 3 ml of an aqueous potassium hydroxide solution having a specific gravity of 1.350 (20° C.) as an electrolyte, there was prepared a rectangular manganese dioxide-cadmium battery S of the present invention employing a synthetic resin battery jar having a nominal capacity of 100 mAh.

Figure 9:
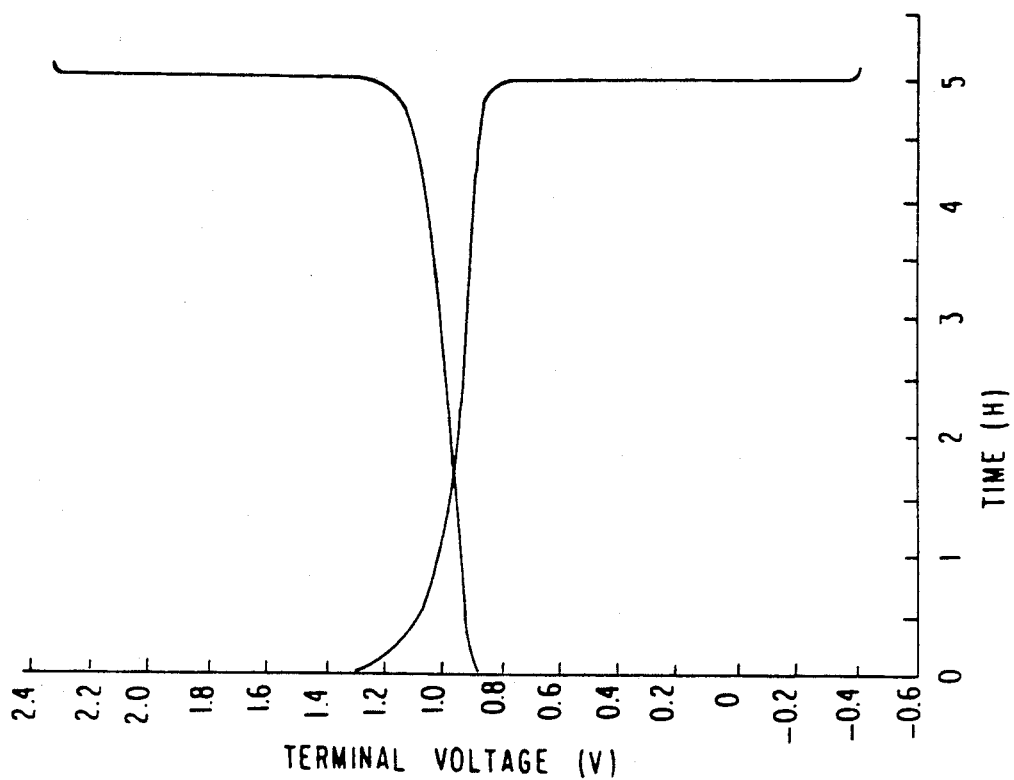
FIG. 9 shows charge and discharge characteristics of a manganese dioxide-cadmium battery made in accordance with the invention.

This battery was discharged at 20° C. at an electric current of 0.2 C and then charged at the same electric current, and the voltage characteristics thus evaluated are shown in FIG. 9. From this figure, it can be seen that this manganese dioxide-cadmium battery shows large and sharp voltage changes in the final stages of the charge and the discharge. Although this battery is not suited for use in preparing high capacity batteries because its capacity is limited by the negative electrode, it has characteristics of a kind of capacitor having high reliability, and the system is almost free from self-discharge of both of the positive active material and the negative active material. Since the electrochemical equivalent of $MnO_2$ and $Cd(OH)_2$ is 3.24 g/Ah and 2.73 g/Ah, respectively, the content of cadmium hydroxide in the discharged state, in terms of the weight ratio thereof to the manganese dioxide as the positive active material is 0.84 or less (2.73/3.24) in order to produce the effect of the present invention.

The above explanations have been given with reference to nickel-cadmium batteries and manganese dioxide-cadmium batteries as examples. However, even by the use of silver oxide as a positive active material, there can be prepared a silver oxide-cadmium battery whose charging can be controlled easily and which has good life performance.

EXAMPLE 7

For preparing a positive electrode, an expanded metal of silver as a collector was pressure-sintered together with a silver oxide powder according to an ordinary way, and the sintered product was subjected to electrolytic oxidation in an aqueous potassium hydroxide solution. Thereafter, the resulting product was washed with water and then dried, thereby preparing two positive electrodes of $1.3 \times 14 \times 52$ mm having a theoretical capacity of 500 mAh. Further, 100 parts of a metallic cadmium powder, 5 parts of a nickel hydroxide powder, and 0.15 part of short fibers of polyamide having a length of 1 mm were kneaded together with 25 ml of propylene glycol containing 0.3 wt % polyvinyl alcohol, to give a paste. This paste was applied on an expanded metal of copper, dried and then pressed, thereby preparing a negative electrode of $3 \times 14 \times 52$ mm in which metallic cadmium had a theoretical capacity of 1000 mAh.

Then, this one negative electrode was wrapped fourfold by cellophane of 0.02 mm in thickness and subsequently interposed between the two positive plates, and then using 3 mml of aqueous potassium hydroxide solution having a specific gravity of 1.250 (20° C.) as an electrolyte, there was prepared a rectangular silver oxide-cadmium battery T of the present invention employing a synthetic resin battery jar having a nominal capacity of 500 mAh. It has external dimensions of 67 $\times 16.5 \times 8$ mm. Also, it is equipped with a safety valve operating at 0.5 kg/cm². This battery has almost no cadmium hydroxide for reserve, and when this battery is in its completely discharged state, the content of cadmium hydroxide in the negative electrode, in terms of the weight ratio of the cadmium hydroxide to the positive active material, is about 1.36 times (2.73/2.01).

Figure 10:
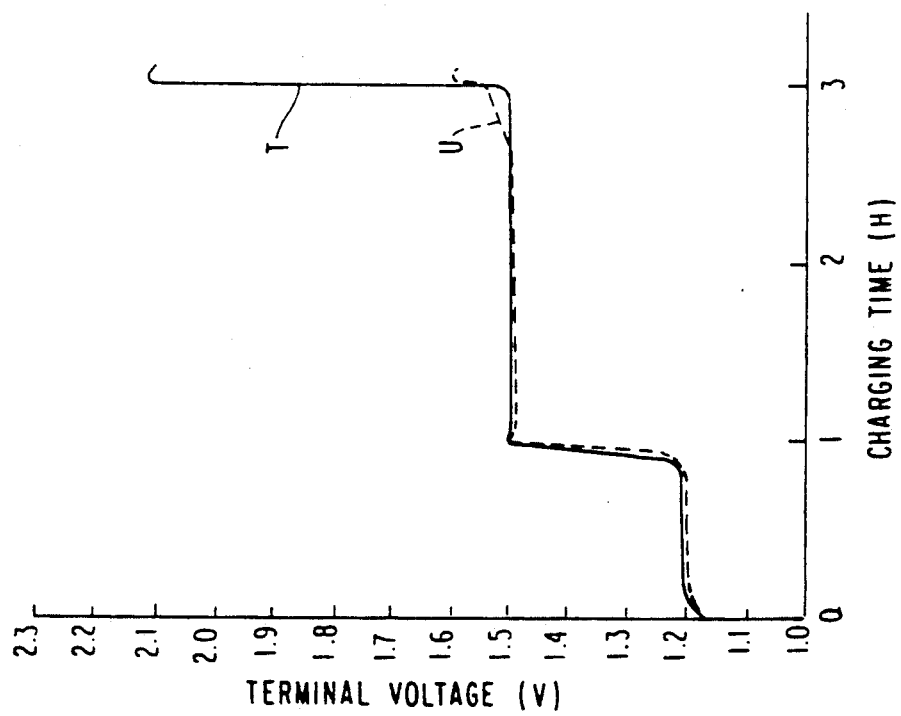
FIG. 10 shows a comparison in charge characteristics between a silver oxide-cadmium battery made in accordance with the invention and a conventional battery.

This battery was discharged by 300 mAh at 20° C. at an electric current of 0.2 CA and then charged at the same current. The thus-evaluated charging voltage characteristics are shown in FIG. 10. For comparison, a conventional rectangular silver-cadmium battery U was prepared by the use of a negative electrode which had been prepared, as in the example, using 50 parts of cadmium oxide and a metallic cadmium powder as negative active materials and which contained cadmium hydroxide for reserve in an amount of 20% based on the theoretical capacity of the positive active material, and the results of its evaluation are also shown. This figure shown that, as compared with the voltage increase in the final stage of the charge of the conventional silver-cadmium battery, the silver oxide-cadmium battery according to the present invention shows an abrupt increase in the final stage of charge, with the shape of the curve being almost at right angles and sharp, and that the method for the control of charge based on the detection of a voltage change can easily be applied to the battery and, further, its reliability is high.

POSSIBILITY OF INDUSTRIAL APPLICATION

As described hereinabove, the alkaline battery of the present invention has enabled the easy and precise control of charge due to the greatly large and sharp voltage change in the final stage of charge as compared with conventional alkaline batteries. Furthermore, since it needs almost no cadmium hydroxide for reserve, the oxygen gas generated from the positive electrode can efficiently be absorbed. Taking advantage of these functions, there can be realized highly reliable superquick charge such as the 10 C charge of, for example, a nickel-cadmium battery, not to mention the quick 1 C charge of a rectangular nickel-cadmium battery, which has been regarded as impossible. In other words, the conventional alkaline battery is lower in discharge voltage than the lead battery. It can be said that utilizing this drawback as an advantage based on a design conception inconceivable so far, it has now become possible to perform superquick charge. Therefore, there is the possibility that by the use of manganese dioxide or silver oxide as a positive active material, there can be obtained a battery having a completely new function from the viewpoint of charge control.

We claim:

1. A nickel-cadmium alkaline storage battery, characterized in that the content of nickel hydroxide or nickel oxide or both in a negative active material is from 2 to 60 wt % based on the total amount of cadmium and that the content of cadmium hydroxide in the negative active material is 0.95 or lower in terms of a weight ratio to nickel hydroxide in a positive active material.

2. A manganese dioxide-cadmium alkaline storage battery comprising a positive electrode comprising manganese dioxide as an active material and a negative electrode comprising metallic cadmium as an active material, characterized in that the content of cadmium hydroxide in the negative active material, as measured when the battery is in the discharged state, is 0.84 or lower in terms of a weight ratio to manganese dioxide in the positive active material.

3. A silver oxide-cadmium alkaline storage battery employing a positive electrode comprising silver oxide as active material and a negative electrode comprising metallic cadmium as an active material, characterized in that the content of cadmium hydroxide in the negative active material, as measured when the battery is in the discharged state, is 1.36 or lower in terms of a weight ratio to silver in the positive active material.

4. An alkaline battery according to claim 3, wherein the content of powdery metallic cadmium in the negative active material is 5 wt % or more based on the total amount of metallic cadmium.

5. An alkaline storage battery according to claim 1, wherein the content of powdery metallic cadmium in the negative active material is 5 wt % or more based on the total amount of metallic cadmium.

6. An alkaline storage battery according to claim 1, wherein a positive electrode which comprises as an active material a hydroxide having a cobalt content of from 15 to 85 wt % based on the sum of nickel and cobalt is used.

7. An alkaline storage battery according to claim 2, wherein nickel hydroxide is incorporated in the positive active material, cadmium hydroxide is incorporated in the negative active material, and the content of nickel hydroxide is 1.05 or more in terms of a weight ratio to cadmium hydroxide.

8. An alkaline storage battery according to claim 1, 2, 3 or 4, wherein a collector made of copper or cadmium or a collector comprising a conductor made of iron or nickel having formed thereon a thin layer of copper or cadmium is used as the negative electrode.

9. An alkaline storage battery according to claim 1, 2, 3 or 4 wherein a collector comprising copper having formed thereon a thin layer of mercury is used as the negative electrode.

10. An alkaline storage battery according to claim 1, 2, 3 or 4, wherein a separator is made of polypropylene.

11. A process for preparing an alkaline storage battery, which comprises using a negative electrode in its charged state in the assembly of the alkaline storage battery according to claim 1, 2, 3, or 4.

12. A process for preparing a sealed-type alkaline storage battery which comprises assembling the alkaline storage battery according to claim 1, 2, 3 or 4, overcharging the battery, and then sealing the battery.

* * * * *